Sept. 6, 1955  W. O. BECHMAN ET AL  2,716,907
CONTROL FOR STEERING-BY-DRIVING MECHANISM
Filed April 19, 1950  6 Sheets-Sheet 4
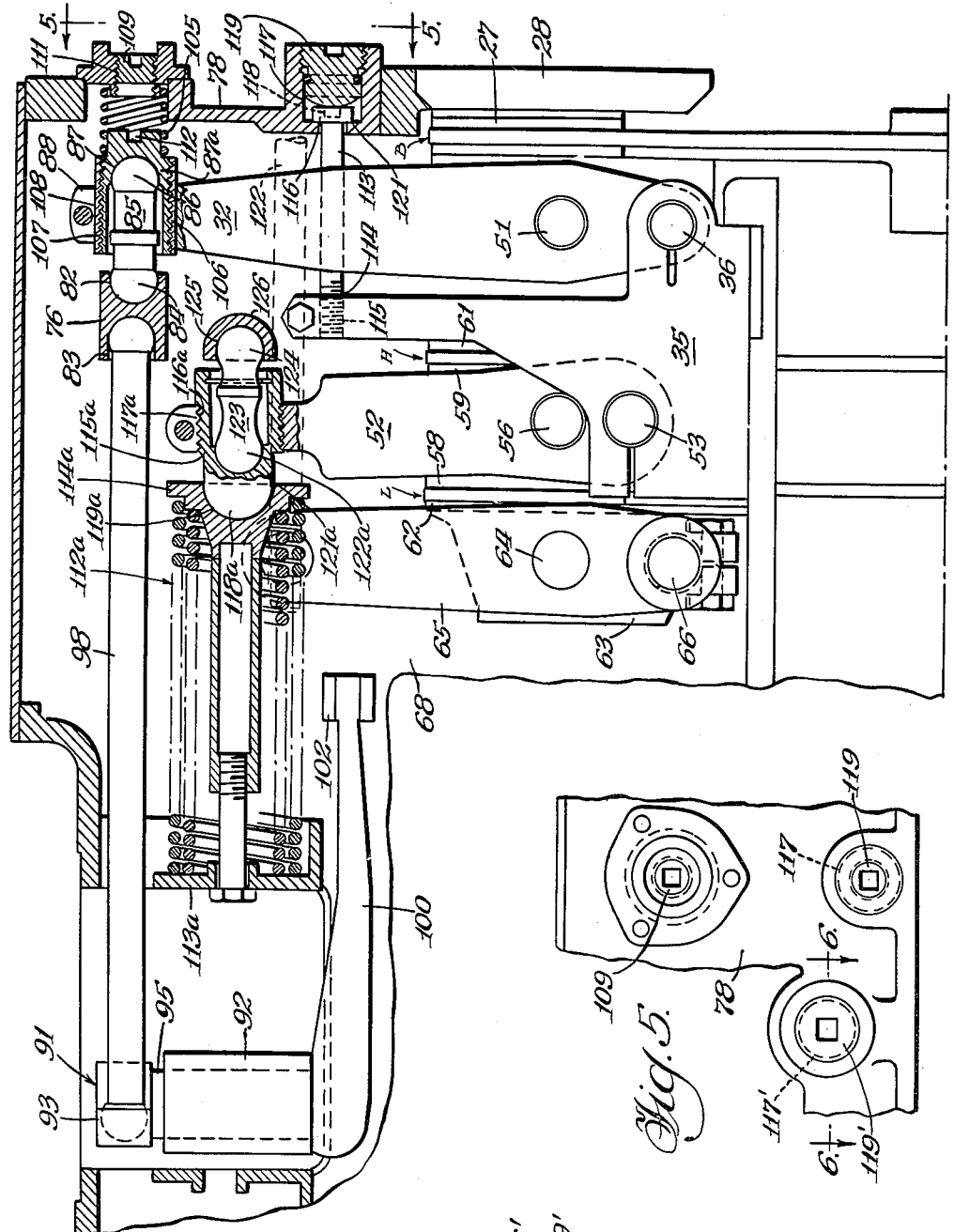
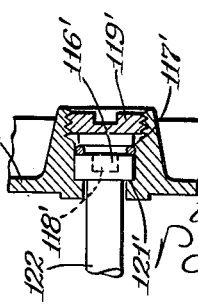
Inventors:
David B. Baker
William O. Bechman
Harry A. Land
William W. Henning
Paul O. Pippel
Atty.

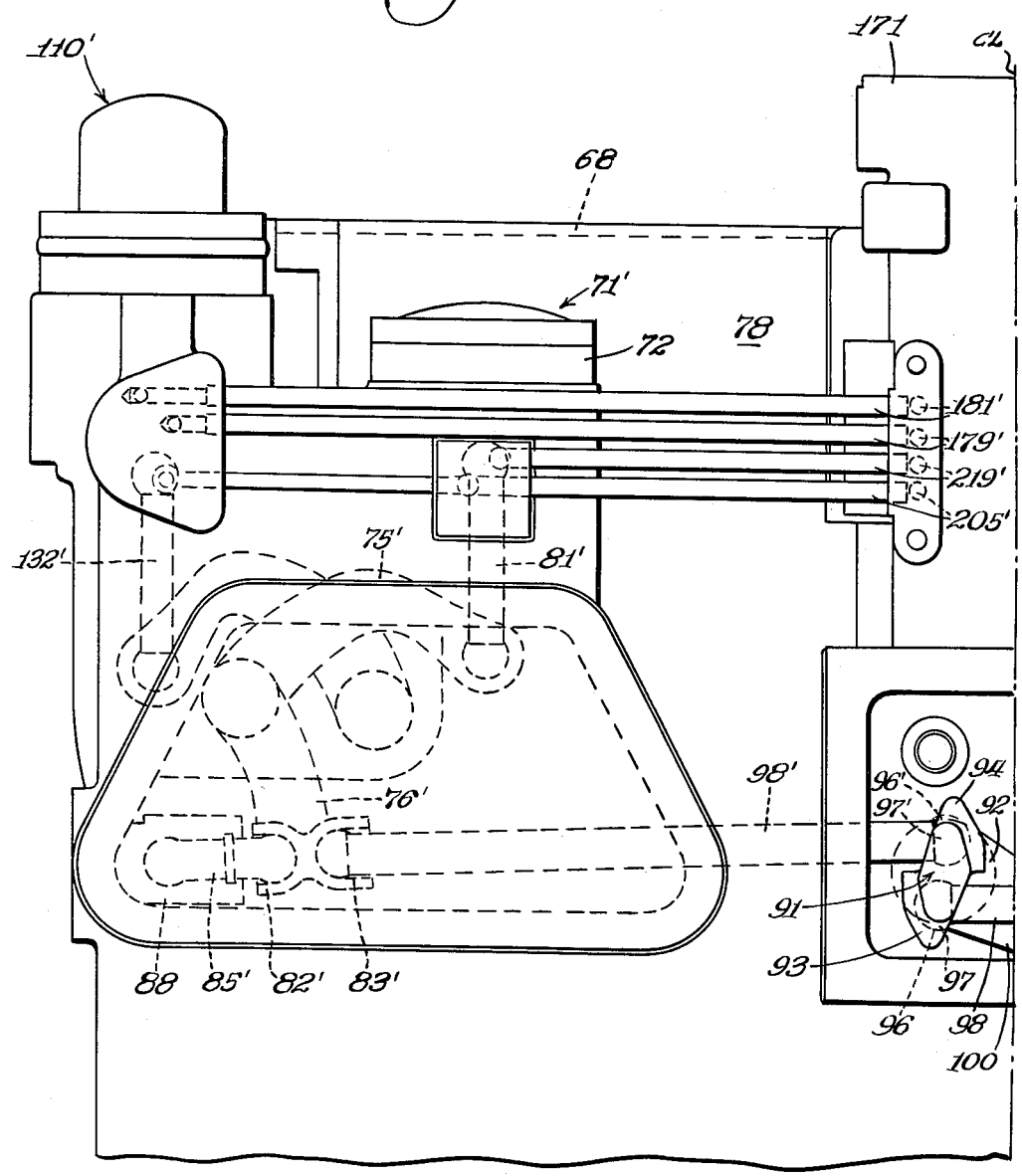

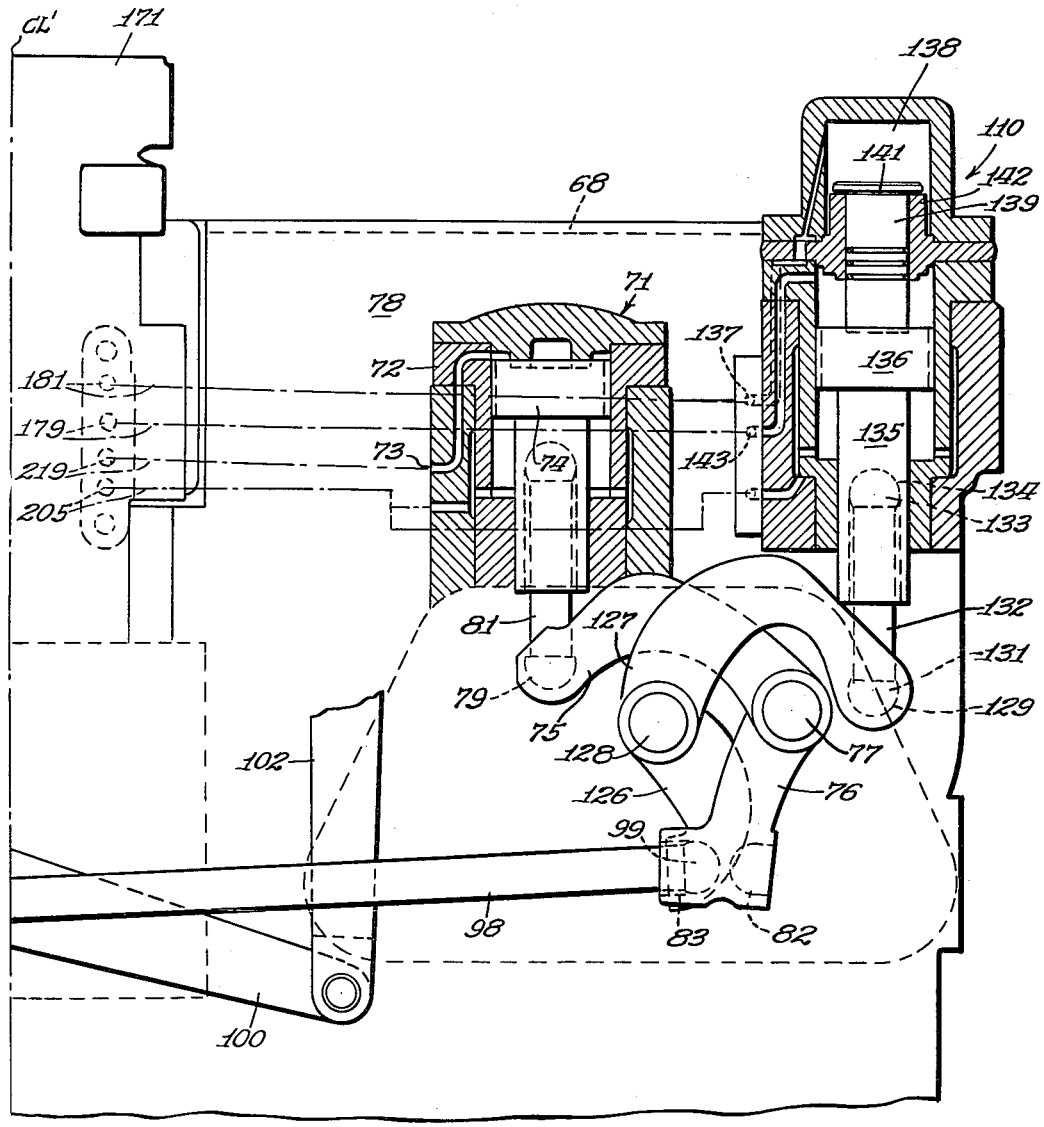

Sept. 6, 1955 W. O. BECHMAN ET AL 2,716,907
CONTROL FOR STEERING-BY-DRIVING MECHANISM
Filed April 19, 1950 6 Sheets-Sheet 5

Inventors:
David B. Baker
William O. Bechman
Harry A. Land
William W. Henning
Paul O. Pippel Atty

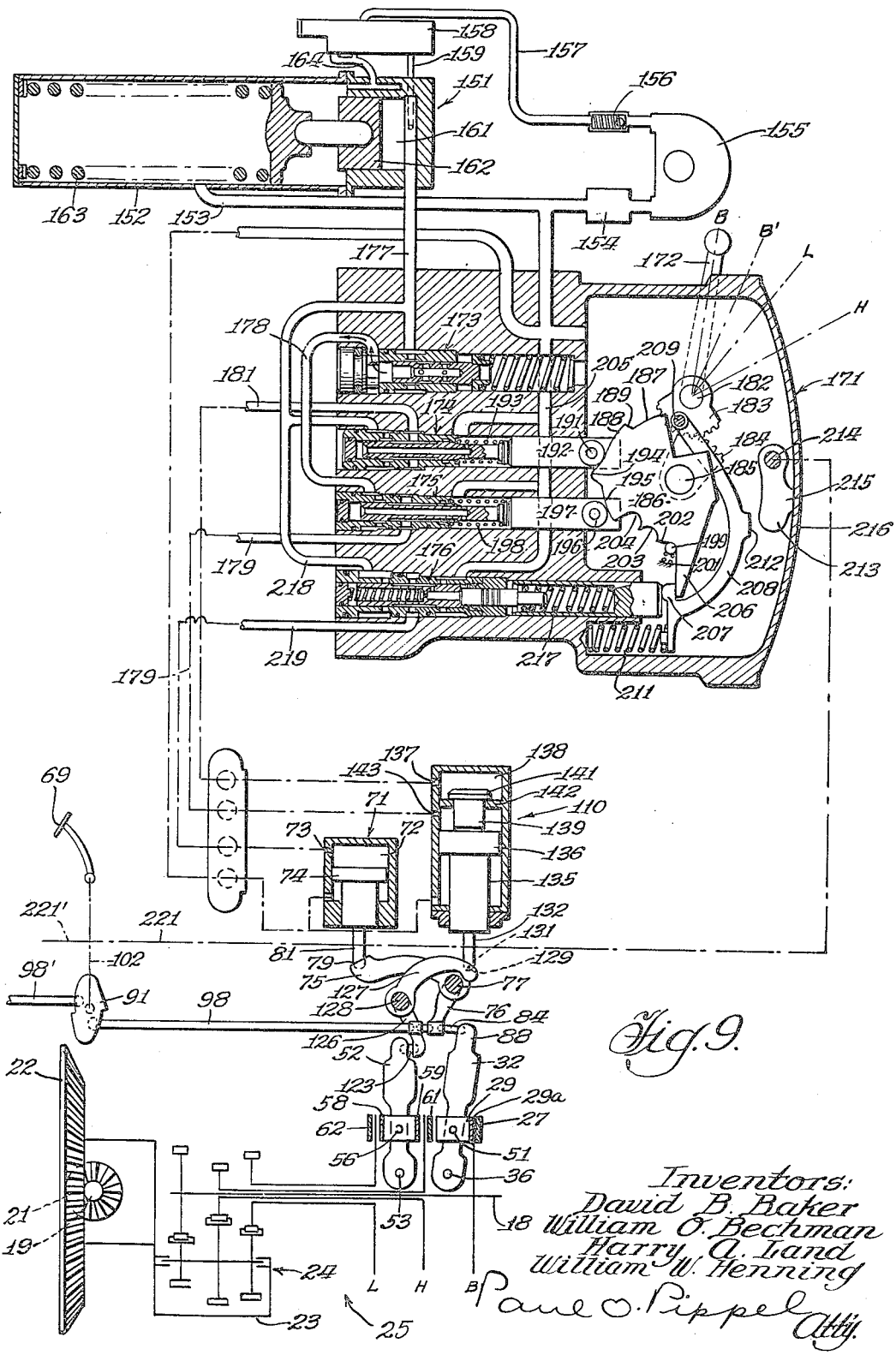

United States Patent Office 2,716,907
Patented Sept. 6, 1955

2,716,907

CONTROL FOR STEERING-BY-DRIVING MECHANISM

William O. Bechman and Harry A. Land, Chicago, and David B. Baker and William W. Henning, Riverside, Ill., assignors to International Harvester Company, a corporation of New Jersey Application April 19, 1950, Serial No. 156,764

10 Claims. (Cl. 74—720.5)

This invention has to do with steering control apparatus for steering-by-driving vehicles, and more particularly concerns improvements in steering brake engaging means together with means selectively controlling the engagement and engagement intensities of a plurality of brakes for attaining different speeds of vehicle propelling means at each side of the vehicle.

Brake applying and control mechanism constructed in accordance with this invention is adapted for use in controlling the speed and turning radii of steering-by-driving vehicles having change-speed final drive gearing and brakes as that illustrated in U. S. Patent No. 2,496,429, issued February 7, 1950, in the name of David B. Baker et al, for Vehicle Change-Speed and Steering Gear. The present mechanism is related to an improvement over brake applying and control mechanism shown in U. S. Patent No. 2,468,628, issued April 26, 1949, in the name of William W. Henning, for Hydraulic Control System for Steering-By-Driving Mechanism.

Steering-by-driving vehicles have vehicle propelling means commonly in the form of self-laying tracks at opposite sides thereof. When these two propelling means are driven at the same speed they propel the vehicle in a straight course forwardly or rearwardly according to the direction in which the propelling means is driven. The course of the vehicle can be varied from a straight line by changing the relative speed of the propelling means. In the vehicle with which the present invention is associated the vehicle body has a customary final drive casing forming a rear portion thereof and containing two final drive change-speed transmission units having respective driven shafts and respectively drivingly connected with the two propelling means. The vehicle engine occupies a forward position on the vehicle body and the crankshaft of this engine is connected through a releasable main clutch with a main change-speed transmission unit. The driven shaft of this main change-speed transmission unit extends into the final drive casing where a driving connection is had with each of the final drive change-speed transmission units. These final drive transmission units are of the orbital gear type, each having two brakable disks alternatively holdable against rotation for causing the driven shafts of these final drive transmissions to rotate at relatively high or low speeds. Such brake disks are coaxial about the driven shafts respectively associated therewith and are spaced apart axially of these shafts. Also in coaxial axially-spaced relation with each of these sets of brake disks is a third brake disk rigidly secured to the associated driven shaft. The first two disks in each of these sets of brake disks are known as high and low speed transmission brake disks respectively whereas the third disk in each set is known as the "driven shaft" brake disk. When the two high speed brake disks are constrained against rotation and driving force is transmitted through the main clutch and the main transmission to the final drive transmissions, the vehicle will be driven in a straight course (forwardly or rearwardly dependent upon the setting of the main transmission unit) at relatively fast speed. Under these same circumstances except that the high-speed brake disks are released so they can turn freely and the two low-speed brake disks are constrained against rotation, the final drive transmissions will cause the propelling means at the sides of the vehicle to rotate at the same relative speed to cause straight line movement of the vehicle but more slowly. The vehicle can be braked to a stop or held on an incline against forward or rearward movement by applying braking force to the shaft brake disks while the transmission brake disks are released. The vehicle can be caused to change its course by selective engagement of different brake disks in the two brake disk sets thereby causing the propelling means sides of the vehicle to be driven at different speeds, or, either propelling means to be braked and held immovable while the other propelling means is power driven.

To facilitate the ease of steering and maneuvering the vehicle, hydraulic rams are used for engaging the various brakes. Two control levers, one for each set of the aforesaid brakes, are provided conveniently accessible to the operator. These control levers are placed side by side for rocking motion coaxially about an axis extending transversely of the vehicle. When these levers are in a forward position they condition a hydraulic circuit to energize rams for causing engagement of the high speed brakes, and when such control members are in a more rearward position the hydraulic circuit is conditioned for causing engagement of only the low speed brakes, and when the levers are in a rearmost position they cause engagement of only the driven shaft brakes.

Inasmuch as the transmission brake disks in each set are mechanically inter-connected, undue brake wear would be incurred if they were simultaneously engaged. Consequently the control apparatus is so designed that a quick transfer is made between engagement of the transmission brakes in each set. The control members have definite high speed and low speed positions in which the high speed and low speed brakes associated therewith are respectively fully engaged. Shifting of these control members from either speed position to the other involves a quick complete change of brake engagement to avoid a concurrent engagement of the brakes in either set. However, subsequent to retraction of the control levers rearwardly beyond the low speed position which incurs disengagement of the low speed brake, it is usually desirable to only partially engage the shaft brakes. An object of this invention is the provision in the steering-by-driving control mechanism of this character of a hydraulic system operable under control of the manual control members to cause engagement of the shaft brakes with an intensity correlated with the distance these members are retracted into a braking range rearwardly of the low speed positions of these members.

A further object is the provision of a hydraulic control system under control of control members as aforesaid, including fluid pressure controlling valves operable to subject the shaft brake operating rams to fluid pressure of an intensity correlated with the distance of retraction of said members into the braking range, together with other manually-operated brake applying means alternatively operable through said valves for causing engagement of the shaft brakes.

A further object is the provision in connection with a final drive casing having final drive change-speed transmission units and their associated sets of brakes including shaft brakes mounted therein at opposite sides of the fore and aft median line of the vehicle, of power operated lost motion linkages connected with pivoted operators for the brakes, and a manually operated double lever structure pivotally mounted on the casing between the sets of brakes and having lost-motion thrust members inserted between respective arms thereof and the brake operators as an alternative means of manually applying the brakes independently of hydraulic power.

Still a further object is the provision of an improved steering-by-driving control according to the preceding object wherein the shaft brakes are operated by hydraulic rams in accordance with the pressure of fluid admitted through pressure control valves, together with means for operating said valves in accordance with the operation of the manually-operated thrust members whereby power application of the brakes is incurred excepting in the case of hydraulic power failure.

Another object is the provision of an improved mounting means for brake-operating members in the form of yokes, such means including a mounting bracket having a plurality of brake shoe carrying yokes rockably mounted thereon between certain of the brake disks against which the brake shoes are frictionally engaged pursuant to rocking of the yokes.

These and other desirable objects inherent in and encompassed by the invention will be more readily conceived from the ensuing description, the appended claims and the annexed drawings, wherein:

Fig. 1 is a diagrammatic plan view of a steering-by-driving vehicle in the form of a crawler tractor, and illustrating the manner in which control apparatus constructed in accordance with this invention is mounted thereon.

Figs. 2 and 3 are respective counterparts of a fragmentary plan view of the final drive housing constituting the rear part of the tractor body shown in Fig. 1, these views being complementally assembled when the line CL along the right-hand edge of Fig. 2 coincides with the line CL' along the left edge of Fig. 3, these lines CL and CL' coinciding with the longitudinal median line ML in Fig. 1. The Fig. 3 component of the Fig. 2—Fig. 3 plan view is partly in section and partly diagrammatic for clarity of illustration.

Fig. 4 is a fragmentary vertical sectional view taken through the final drive casing substantially on the plane indicated by the line 4—4 in Fig. 1, this view illustrating the mounting of the brake operator members (yokes), the relation of these yokes to the transmission and shaft brake disks associated therewith, together with a part of the linkage for controlling the rocking of the brake operator members.

Fig. 5 is a fragmentary elevational view taken on the line 5—5 of Fig. 4 showing a portion of a final drive casing end wall and the position of brake strut and brake wear take-up adjusting means accessible for manipulation through openings in such wall.

Fig. 6 is a detailed sectional view taken on the line 6—6 of Fig. 5.

Fig. 9 is a diagrammatic view illustrating the pressure source of the hydraulic control system together with valves, hydraulic rams, brake operators and the final drive change-speed gearing for controlling the speed of the driven shaft which is drivingly connected with the propelling means at the right side of the vehicle, as viewed in Fig. 1.

Figure 1:
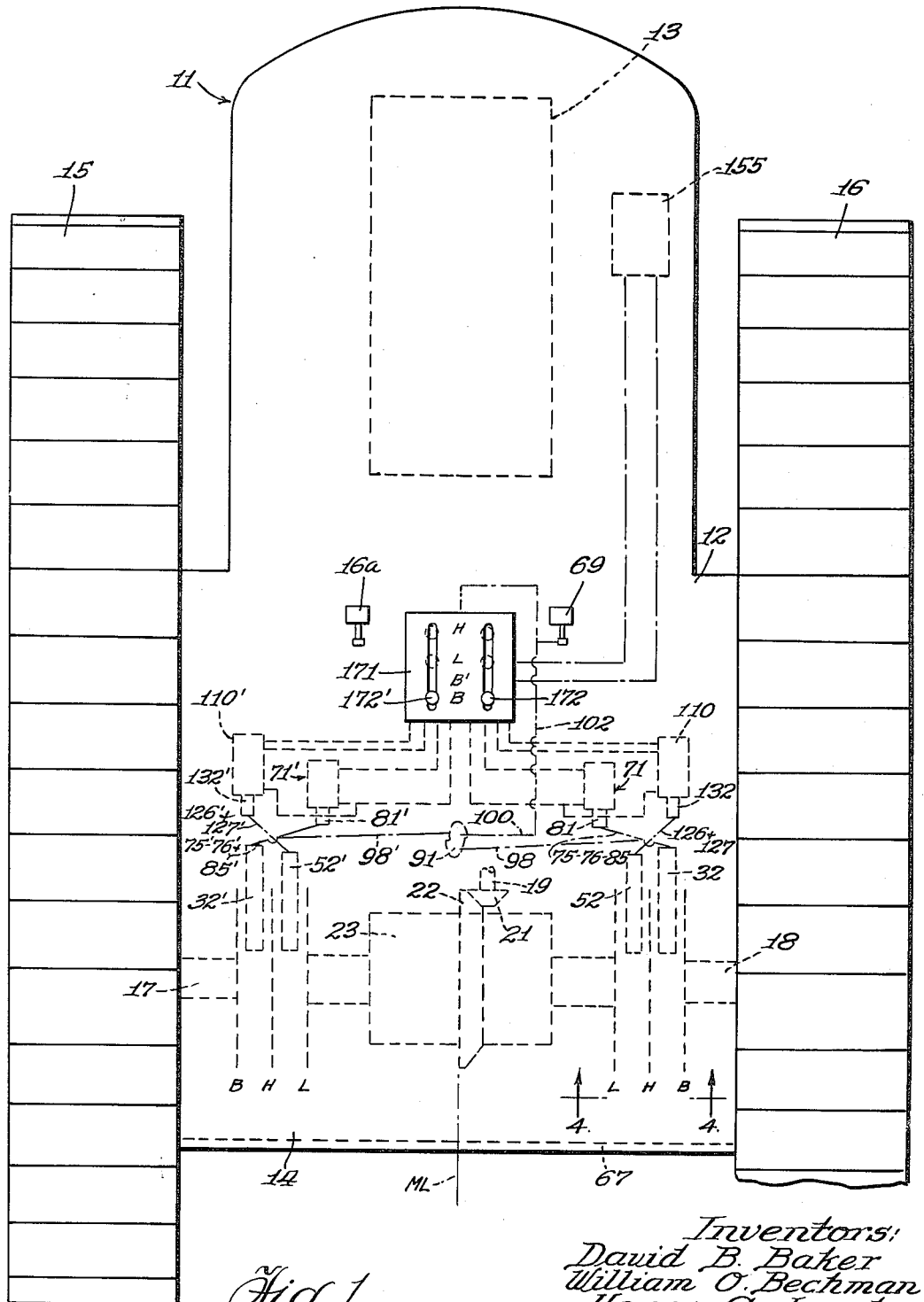

The crawler tractor 11, Fig. 1, in connection with which the preferred embodiment of the invention is herein illustrated, includes a body 12 having a diagrammatically illustrated engine 13 on its forward end, a final drive casing 14 at its rearward end and endless treads or tracks 15 and 16 at opposite sides of such body 12. These endless tracks are independently driven by coaxial oppositely extending and independently drivable driven shafts 17 and 18. When the shafts 17 and 18 are driven at the same speed in the same direction the tracks 15 and 16 will be driven at the same speed for causing movement of the vehicle in a straight course. Veering of the vehicle from the straight course at selected angles of departure or for making a pivot turn is effected by driving the tracks at different speeds or by holding either of the tracks against movement while the other track is driven.

Power from the vehicle engine 13 is transmitted through a main clutch (not shown but controlled by a pedal 16a) and a main change-speed transmission (not shown) to a tail shaft 19, Figs. 1 and 9, which extends from said change-speed transmission into the final drive casing 14. A bevel pinion 21 on the shaft 19 drives a bevel gear 22 which is connected for rotation with an orbital gear carrier 23, Figs. 1 and 9, containing identical final drive change-speed gearing units 24 constituting change-speed power transmission mechanisms selectively arrangeable for transmitting driving force respectively to the driven shafts 17 and 18 at high or low speeds or arrangeable in neutral. A portion of one of the final drive change-speed gearing units 24 is shown diagrammatically in Fig. 9 for driving the shaft 18. A complete steering-by-driving apparatus including both gearing units as 24 is shown and described in detail in the above mentioned Patent No. 2,496,429. It will suffice to here explain, therefore, that the gearing unit 24 is operable when a low-speed brake disk L is braked for holding it against rotation while disks H and B are free to rotate, the driven shaft 18 is caused to rotate at a relatively low speed and that when the high-speed brake disk H is braked for holding it against rotation while the disks L and B are free to rotate, the shaft 18 is caused to rotate at a relatively high speed. Brake disk B is connected for rotation with the shaft 18 so, of course, when braked, resists rotation of the shaft 18 and of the track 16 with which this shaft is drivingly connected. Inasmuch as the brake disks L and H of the steering-by-driving apparatus 25 are operable for selectively arranging the change-speed power transmitting mechanism 24 for transmitting driving force to the driven shaft 18 for causing this shaft to be driven at relatively high or low speeds, or to cause this mechanism to be in a neutral condition wherein no driving force is transmitted to the shaft 18, these disks L and H are referred to as the transmission brake disks. The disk B is referred to as the shaft brake disk.

Figure 7:
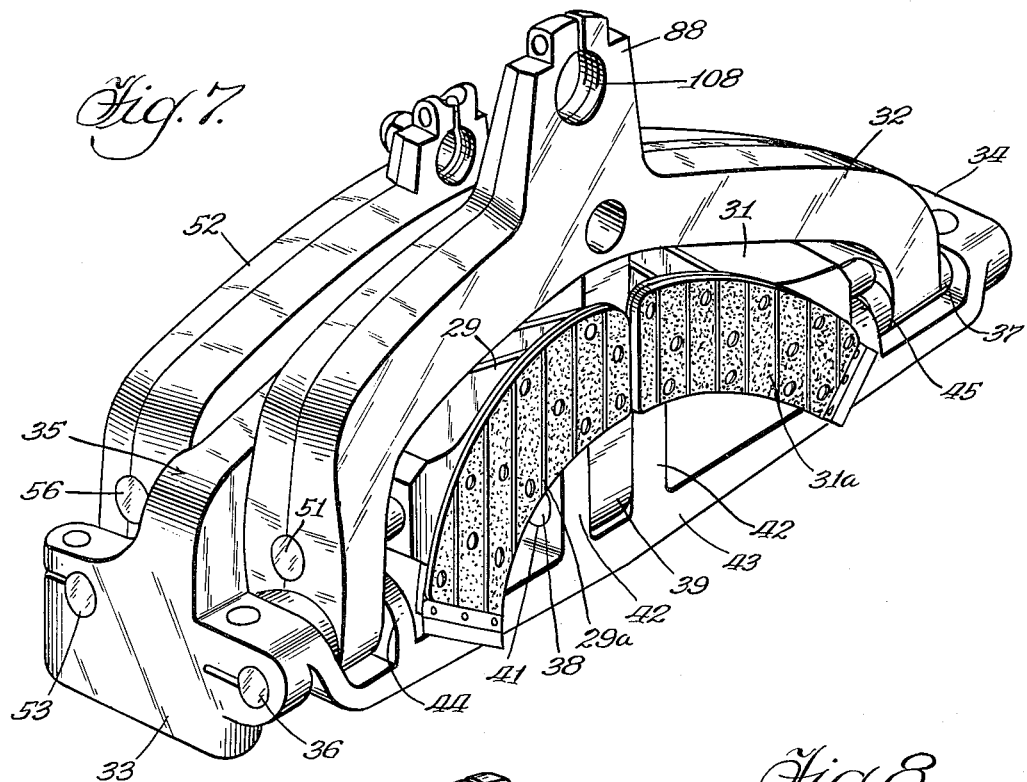
Fig. 7 is an enlarged perspective view of a sub-assembly including a frame having transmission brake operator members rockably mounted thereon.

Each of the brake disks B is frictionally engageable by the complemental action of an arcuate fixed brake shoe 27 mounted on an end wall 28 of the final drive casing and movable arcuate brake shoes 29 and 31 having friction faces 29a and 31a, Figs. 9 and 7. These brake shoes 29 and 31 are pivotally carried upon a shaft brake operator in the form of a rockable yoke 32 which is pivotally mounted upon end portions 33 and 34 of a frame 35 by pivot pins 36 and 37 and a third pivot pin 38 carried by a center leg 39 of this yoke 32 and journaled in bearings 41 of apertured ears 42 mounted upon a horizontal bottom flange portion 43 of the frame 35. This horizontal flange portion 43 also has apertured ears 44 and 45 respectively adjacent to the leg ends of the yoke 32 for receiving inner ends of the pivot pins 36 and 37. The bearing apertures in the ears 42, 44 and 45 are coaxial with the bearing pins 36 and 37 secured in the frame end portions 33 and 34. A pivot shaft 51 has opposite ends mounted respectively in one leg of the yoke 32 and in the center leg 39. A similar pivot shaft extends between the center leg 39 of the yoke and the opposite end leg thereof for similar pivotal mounting of the brake shoe 31. Such pivotal mounting of the brake shoes 29 and 31 enables them to maintain the friction faces 29a and 31a in parallelism with and flatly engaged with the shaft brake disk B when pressed thereagainst as illustrated in Fig. 9.

Figure 8:
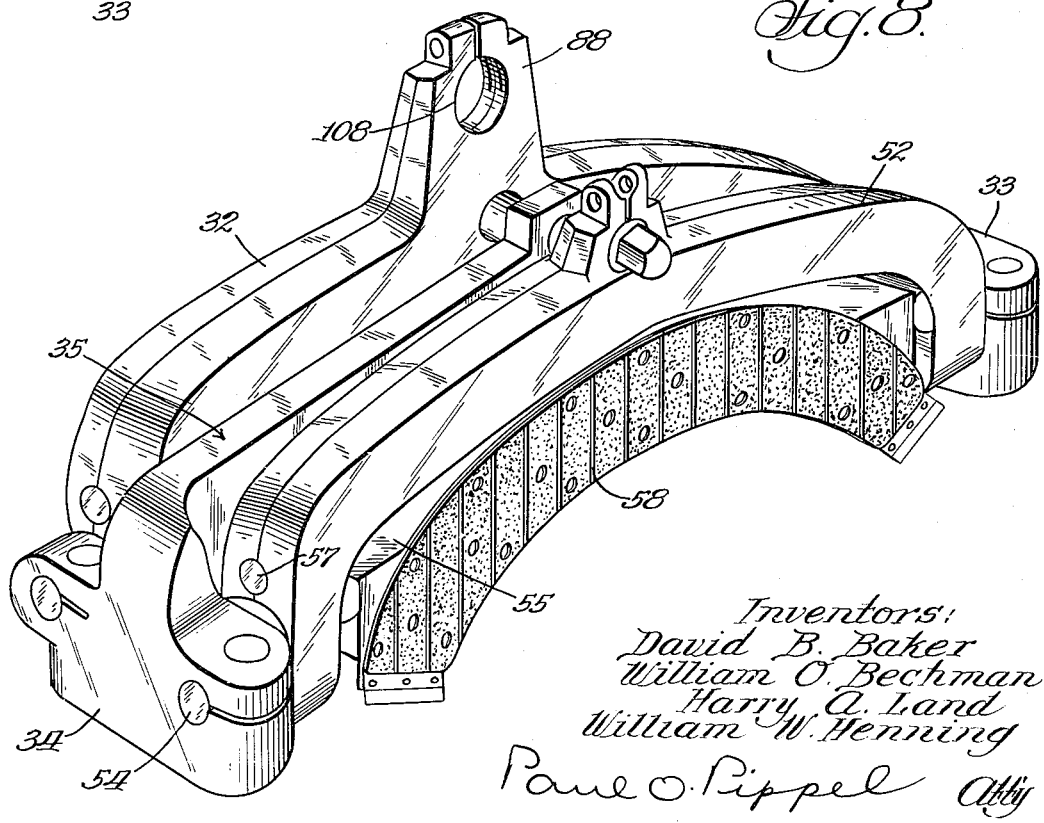
Fig. 8 is a perspective view of the sub-assembly shown in Fig. 7 but taken from the opposite side thereof.

Frame 35, Figs. 7 and 8, also serves as a support for a brake operator yoke 52 which has its two ends pivotally mounted thereon by means of bearing pins 53 and 54 which are respectively carried in the end portions 33 and 34 of said frame, pin 53 being shown in Fig. 7 and pin 54 in Fig. 8. A brake shoe 55 is pivotally carried in the yoke 52 by pivot pins 56 and 57. There are two friction faces on the shoe 55, one face being designated 58 in Fig. 8 and the other 59 in Fig. 9. When the yoke 52 is rocked clockwise, Figs. 4 and 9, about the fixed pivots 53—54, a segment of the shaft brake disk H becomes frictionally engaged between friction surfaces 59 and 61, the latter being on frame 35. When the brake operator 52 is swung counter-clockwise, Figs. 4 and 9, the friction face 58 is adapted to compress a section of the brake disk L against a friction face 62 carried on a brake shoe 63 pivotally carried upon coaxial pins 64 at opposite ends thereof and mounted in the legs of a brake reaction yoke 65 which embrace the shoe 63, one of the legs of the yoke 65 being shown in Fig. 4. Each leg of the yoke 65 carries a pivot pin 66 and these two pins 66 are journaled in bearings, not shown, respectively, upon the rear wall 67 of the final drive casing and the opposed forward wall 68, Figs. 3 and 4.

Brake operator yoke 32 is adapted to be operated either manually by the operation of the pedal 69, Fig. 9, or by a brake control hydraulic motor means in the form of a ram 71 energizable for applying braking force to the shaft brake operator 32 according to the magnitude of fluid pressure imposed upon such ram. Fluid pressure introduced into the ram chamber 72 through a port 73 will force a piston 74 endwise for imparting thrust against one arm 75 of a multi-arm lever structure 75—76 pivotally mounted upon a fixed pivot pin 77 secured to the final drive casing cover 78, Figs. 3 and 4. A ball-and-socket connection 79 is provided between a piston rod 81 of the piston 74 and the arm 75, Figs. 3 and 9. Arm 76 of the multi-armed lever structure 75—76 has two sockets 82 and 83. Socket 82 receives a semi-spherical (ball) end 84 of a thrust link 85 which has an opposite ball end 86 disposed within a socket 87 of a socket member 87a carried in a boss 88 projecting upwardly from the lever 32; see Figs. 4, 7 and 8.

The force-transmitting power train including the thrust member 81, the driving lever arm 75 of the lever structure 75—76, driven lever arm 76 of such lever structure and the thrust member 85 disposed in series between the ram piston 74 and the rockable brake-operating member 32 is duplicated on the opposite side of the final drive casing, as shown in Figs. 1 and 2 where corresponding parts are identified by the same respective characters with the addition of a prime. The various sockets for receiving the ball-like formations upon the ends of the thrust members 81 and 85 are sufficiently deep to facilitate telescopic lost motion of the parts at these ball and socket joints, thereby accommodating untrammeled operation of the brake-operating members 32 and 32' by a manually-operated linkage next to be described and also to accommodate substantial tolerance in the accuracy of the positions and dimensions of the rams, lever structures and brake-operating yokes 32 and 32'.

A double-arm lever structure 91, Figs. 2, 4 and 9, is pivotally mounted in a bearing 92 on the final drive casing cover 78. The arms of this lever structure 91 are respectively designated as 93 and 94 and a spindle 95 extends downwardly from this lever structure into the bearing 92. Lever arm 93 contains a socket 96 for a ball 97 on the inner end of a thrust exerting structure in the form of a rod 98. The outer end of rod 98, Fig. 3, has a ball end 99 disposed in the lever arm socket 83. A thrust rod 98' corresponding to the rod 98 and assembled with corresponding elements designated by the same respective reference characters with the addition of the prime is connected between the lever arms 94 and 76'. When the double arm lever structure 91 is rocked counterclockwise, as viewed in Figs. 2 and 9, a thrust force can be transmitted through the thrust members 98 and 98' for rocking the yokes 32 and 32' for simultaneously applying braking force to the shaft brake disks B at the two sides of the vehicle. Rocking of the double-arm lever structure 91 is manually effected through a horizontal lever 100, Figs. 1, 2, 3 and 4, to which manual force is applied through a brake pedal 69 and a tension rod 102, Figs. 1 and 3. A manually operated linkage, including the double arm lever 91, the thrust rods 98—98' and the ball and socket joints at the ends of these rods, contains sufficient telescopic motion in these joints to facilitate rocking of the brake-operating members 32—32' by force received from the hydraulic rams 71—71' without incurring movement of the thrust rods 98—98' and the parts connecting them with the pedal 69. These ball and socket joints at the ends of the rods 98—98' have the further advantage of being easily assembled and of accommodating substantial tolerance in the dimensions of and locations of the parts inter-connected thereby. This is a significant factor in view of the large size of the final drive casing and the practice of producing such casing and the parts mounted therein on various machines in different parts of the factory together with the imperativeness that the parts fit into a properly operating mechanism when put together on an assembly line.

Normally the shaft brake B is maintained in a disengaged position by a spring 105, Fig. 4, which reacts between an end wall of the final drive casing cover 78 and the socketed member 87a mounted in the upper end of the brake operator 32. Socketed member 87a is screw-threaded at 106 into an internally threaded sleeve 107, clamped into a split bore 108 in the projection 88 of the associated member 32. This facilitates adjustment of the brake-applying linkage by removing a screw plug 109, Figs. 4 and 5, from a threaded opening 111 in the associated casing cover end wall and thereafter inserting a square-ended tool into a square sectioned recess 112 in the socketed member 87a for rotating this member and changing its axial position in the sleeve 107 and correspondingly changing the rocked position of the brake-applying member 32 relatively to the associated ram piston 74 and the brake pedal 69.

Access is also provided in the end wall of the final drive casing cover 78 for adjusting a strut 113 for bracing the center upper portion of the brake operator mounting frame 35, Fig. 4. This strut has a threaded inner end 114 meshed with threads in a threaded hole 115 in the frame 35. The outer end of this strut has a head 116 disposed within a hole 117 of the casing cover end wall. A square recess 118 in the outer face of the strut head 116 is adapted to receive a square ended tool (after removal of a screw plug 119 from the hole 117) for rotating the strut to change the spacing of the head 116 from the frame 35. When the screw plug 119 is reinstated it assures placement of the head 116 against a shoulder 121 for rigidly maintaining the upper part of the frame 35 selectively spaced from the end wall of the casing cover 78.

A second strut 122, Figs. 4 and 6, is connected between an upper mid portion of the brake reaction yoke 65 and the casing cover end wall. The inner end of the strut 122 has a threaded connection with the upper part of the yoke 65 similar to that at 114—115 of the strut 113 with the upper portion of the frame 35, and the outer end of this strut 122 has an adjustment-facilitating connection with the casing cover end wall similar to that described for the strut 113. This description is therefore expedited by simply designating the connecting parts for the outer end of the strut 122 by the same respective reference characters used in connection with the strut 113 but with the addition of a prime. By adjusting the rotative position of the strut 122, the rocked position of the brake reaction yoke 65 about the fixed journal pins 66 can be changed for changing the position of the friction surface 62. The initial adjustment of the brakes and subsequent adjustment to compensate for wear of the friction surfaces is thereby facilitated. Struts corresponding to 113 and 122 and their end connections above described are also provided for the corresponding frames and brake reaction levers in that part of the steering-by-driving apparatus in the left side of the final drive casing.

Transmission control hydraulic motor means in the form of a double piston hydraulic ram 110, Figs. 1, 3 and 9, is variably energizable when subjected to various statuses of pressure derived from a fluid pressure source 151 for placing the final drive transmission mechanism 24 on its corresponding side of the final drive casing in neutral, slow speed, or high speed arrangements. A corresponding ram for the mechanism on the left side of the vehicle is designated 110' in Figs. 1 and 2. Confining the description to that part of the final drive change-speed mechanism for the right side of the vehicle, since the left side part is identical, the ram 110 is cooperable with a captive spring structure 112a, Fig. 4, for controlling the pivoted position of the brake operator member 52. This captive spring structure reacts against a wall 113a of the final drive casing cover 78 while exerting force through a socketed cap 114a and a threaded cup-shaped member 115a to the upper end of the brake operator 52 for yieldably holding said member in its clockwise position, Fig. 4, to engage the high speed brake H. The threaded member 115a has screw threads 116a meshed with threads in a threaded split opening 117a in the brake operator so that by rotation of the member 115a its position axially of the opening 117a can be changed. A ball end 118a of the member 115a telescopically rests in a semi-spherical seat 119a in the cap 114a.

Threaded member 115a contains a semi-spherical seat 121a within its inner end for receiving a ball end 122a of a strut member 123 having a ball outer end 124 received by a semi-spherical seat 125 of a lever arm 126, Figs. 3, 4 and 9. The lever arm 126 is one component of a multi-arm structure 126—127 having a second arm 127 pivotal about a fixed pivot pin 128 anchored in the final drive casing cover. Arm 127 contains a socket 129 for telescopically receiving a ball end 131 of a strut 132 having an opposite ball end 133 telescopically seated in a socket 134 in a rod 135 of a piston 136 of the ram 110.

Introduction of fluid under pressure through a port as 137 in a wall of the ram 110 causes development of fluid pressure in a chamber 138 forcing a piston 139 endwise against the piston 136 for moving the latter to a limit determined by abutment of an enlargement 141 of the piston 139 against an end wall 142 of the chamber 138. This concurrent advancement of the pistons 139—136 causes clockwise pivoting of the lever structure 126—127 far enough to retract the brake-operating member 52 into the neutral position against the force of the captive spring structure 112a, thereby providing for both friction surfaces 58 and 59 being out of frictional engagement with the brake disks L and H. Subsequent introduction of pressure fluid into the ram port 143, Figs. 3 and 9, will cause additional advancement of the piston 136 to cause pivoting of the brake operating member 52 further counter-clockwise as viewed in Figs. 4 and 9 for engaging the low speed brake L. Use of the various telescopic ball and socket connections in the power transmitting linkage between the ram piston 136 and the brake operator member 52 accommodates substantial tolerance of accuracy in the relative positions and the dimensions of the connected parts.

A source of fluid under pressure for operating the hydraulic rams is diagrammatically illustrated in Fig. 9 where such pressure source of fluid is generally designated 151. Inasmuch as this pressure source of fluid is shown and described in detail in U. S. Patent No. 2,468,628, it will suffice to explain that fluid (preferably oil) is withdrawn from a spring chamber reservoir 152 through a conduit 153 and a filter 154 into a constantly running pump 155, preferably mounted on and driven from the vehicle engine 13, Fig. 1. This fluid is discharged from the pump through a check valve 156, conduit 157 and a pressure controlling device 158 and a conduit 159 into an accumulator chamber 161. A compression plunger 162 of the accumulator is urged compressibly against the fluid in the chamber 161 by a spring 163 in the spring chamber reservoir 152. After the accumulator chamber 161 is expanded attendant to the pressure therein attaining a predetermined maximum, the pressure controlling device 158 will terminate delivery through the conduit 159 and cause by-pass directly into the reservoir 152 through a low pressure by-pass conduit 164. While this condition prevails the constant delivery pump 155 will operate under low-pressure conditions.

Subjection of the transmission control hydraulic motor means 110 and of the brake control hydraulic motor means 71 to the pressure of fluid at the pressure source 151 is had under control of a manually-operated control means contained in a control casing 171, Figs. 1, 2, 3 and 9. This casing contains two sets of valves and mounts two valve-adjusting control members 172 and 172' respectively for said sets of valves. One set of valves and the associated control member 172' is for the final drive change-speed power transmitting mechanism at the left side of the vehicle and the other set of valves and associated control member 172 is for the final drive change speed power transmitting mechanism at the right side of the vehicle. The set of valves associated with the control member 172 is illustrated in Fig. 9.

The two sets of valves and the two control members 172—172' are identical. Referring, therefore, to Fig. 9, the set of valves there shown includes a pressure reduction valve 173, a high-speed brake releasing valve 174, a low-speed brake engaging valve 175 and a shaft brake-engaging valve 176. The valves 173, 174 and 175 are shown and described in detail in U. S. Patent 2,468,628. Details of the valve 176 are described and claimed in co-pending application, Serial No. 95,559 filed May 26, 1949, in the name of William W. Henning. Pressure reduction valve 173 supplies fluid from the source 151 through conduits 177 and 178 at a reduced pressure to the valve 175 so that when this valve 175 is open the fluid at reduced pressure will be introduced into the ram 110 through a conduit 179 and the port 143 above the piston 136 at less pressure than fluid introduced through the valve 174, conduit 181 and the port 137 into the chamber 138 above the piston 139 wherefore the pressure above the piston 139 will prevail over the pressure below such piston and retractive movement of the piston 139 will not occur with attendant delayed action in the advancement of the piston 136 when it is desired to engage the low speed brake L.

Valve adjusting control member 172 is mounted upon one end of a shaft 182, Fig. 9, with which it is connected for rotation. A gear segment 183 is also connected for rotation with the shaft 182 and meshes with a second segment gear 184 which is mounted on a shaft 185 which connects this segment gear and a control cam 186 for rocking in unison. Cam 186 has a short radius profile 187 which is separated from a long radius profile 188 by a shoulder 189. Profiles 187 and 188 are cooperable with a follower 191 on an axially movable valve plunger 192 of the high-speed hold-out valve 174. This valve is held in the open position illustrated while the profile 188 registers with the follower 191, and a spring 193 moves the plunger 192 to the right for closing the valve 174 when the short radius profile 187 registers with the follower 191. A cam lobe 194 and a profile 195 are alternatively registerable with a follower 196 on a valve plunger 197 of the valve 175. When profile 195 registers with the follower 196 a spring 198 is operable to hold the plunger 197 retracted for closing the valve 175 but when the lobe 194 registers with the follower 196 the plunger is advanced to the left for opening the valve, establishing communication between the reduced-pressure conduit 178 and the conduit 179 for introducing pressure fluid above the piston 136 for engaging the low-speed establishing brake L.

A detent ball 199 is urged radially inwardly of the cam 186 by a spring 201. When the control member 172 moves in the shaft brake engaging range B'—B a profile 202 coaxial with the cam registers with the detent ball 199. Movement of the control lever 172 to position L places a detent notch 203 in registry with the detent ball 199 simultaneously with placing the lobe 194 in registry with the low-speed valve plunger follower 196 while a portion of the profile 188 adjacent to the shoulder 189 remains in registry with the high-speed hold-out valve plunger follower 191. The detent ball 199 thus cooperates with the notch 203 for retaining the cam in this low-speed establishing position.

Upon manual movement of the control lever 172 into position H, a detent notch 204, in cam 186 is brought into registry with the detent ball 199 incident to the cam lobe 194 passing from beneath the follower 196 and bringing the profile 188 into registry with this follower, and the short radius profile 187 into registry with the follower 191. In this manner the valves 174 and 175 are conditioned to connect the conduits 181 and 179 with the low-pressure conduit 205 leading back to the reservoir 152, thereby permitting both chambers of the ram 110 to exhaust and permitting the brake operator 52 to be rocked by the force of the captive spring unit 112a, Fig. 4, clockwise for engaging the high-speed brake H and establishing the high speed power transmitting condition of the final drive change-speed power transmission mechanism 24.

The control means, in the casing 171, for the final drive change-speed transmission mechanism 24 is shown with the valve-adjusting control member 172 in the driven shaft braking range B'—B. The transmission mechanism 24 is then in neutral because the valve 174 is open to direct pressure fluid into chamber 138 of motor 110 to hold pistons 139 and 136 in the positions shown for rocking the brake operator 52 into the position where neither transmission brake L nor H is engaged. As the control member 172 is retracted from the position L and commences to enter the brake range B'—B at point B', a finger 206 abuts against a head 207 on the lower end of a lever 208 mounted upon a fixed pivot 209. At this time a spring 211 will be maintaining the lever retracted with a pad 212 thereon in engagement with a lever 213 which is fixed upon a rockable shaft 214 and rocked to a retractive position with a pad 215 thereon engaged with the casing front wall 216. Continued retraction of the control member 172 from position B' into the range B'—B will cause the cam finger 206 to move the lever head 207 clockwise incident to compressing the spring 211 and moving the control plunger 217 of the shaft brake valve 176 to the left, as viewed in Fig. 9, to cause admission of fluid from the pressure source and a conduit 218 into a conduit 219 at a pressure correlated with the leftward movement of the plunger 217 into the range B'—B. The detent ball 199 will slide along the cam profile 202 attendant to rocking motion of the cam 186. In this manner fluid pressure through the conduit 219 is introduced into the shaft brake ram chamber 72 for engaging the shaft brake B with a pressure intensity correlated with the distance of retraction of the control member 172 into the braking range B'—B. Inasmuch as the spring 211 reacts upon the lower end of the lever 208 and hence against the cam finger 206 for reestablishing registration of the detent notch 203 with the detent ball 199, this spring 211 constitutes means for yieldably rotating the control member 172 advancively from the "Braking" range and operable to so advance such control member incident to manual release thereof while it is in such "Braking" range.

The brake pedal 69, in addition to being connected by a rod 102 with the double-arm lever structure 91, Fig. 9, for mechanically rocking the shaft brake operator members 32 in the event of hydraulic pressure failure, is also connected by a diagrammatically presented linkage 221 with the cross shaft 214 in the forward part of the control means casing 171 whereby depression of the pedal 69 rocks the shaft 214 and the arm 213 in the direction for swinging the lever 208 clockwise for operating the pressure control valve 176 to cause introduction of fluid into the shaft brake ram chamber 72 at a pressure correlated with depression of the brake pedal, wherefore this pedal is operable to cause hydraulic power operation of the shaft brake. A linkage 221' corresponding to the linkage 221 connects the brake pedal 69 with the brake control means for the other side of the vehicle so that depression of the brake pedal causes simultaneous hydraulic power application of both shaft brakes B. The linkages 221 and 221' are adjusted so as to cause the opening of the pressure controlling valves 176 (respectively for the two sides of the vehicle) and the introduction of brake-applying pressure in the brake ram chambers 72 prior to exertion of manual force through the thrust members 98—98' so the brake pedal is easily depressed in the absence of hydraulic pressure failure.

Having thus described a single preferred form of the invention with the view of clearly and concisely illustrating the same, we claim:

1. For use in the control of vehicle steering-by-driving apparatus including driven shafts respectively drivingly connected with propelling means at opposite sides of the vehicle, brakes for said shafts, and change-speed power transmission mechanisms selectively operable for transmitting driving force respectively to said driven shafts to drive the same at relatively high or low speeds or operable to neutral position to transmit no driving force to said shafts: the combination of separate shaft brake engaging means for each brake and variably energizable for engaging its associated brake to cause corresponding variation in its resistance to rotation of the shaft associated therewith; and a separate control means for each change-speed mechanism and the shaft brake engaging means associated with the brake for the shaft driven by such transmission, each control means including a control member manipulatable selectively between "High" and "Low" positions wherein it is settable and manually retractible from the "High" position through the "Low" position into a "Braking" range, said control member being conditionable for operation of its transmission mechanism to arrange it for high speed drive when such member is in the "High" position, for low speed drive when such member is in the "Low" position, and in neutral when such control member is in the "Braking" range, and each shaft brake engaging means being operable to incur shaft rotation resistance of a magnitude correlated with the degree of retraction of the control member therefor into its "Braking" range.

2. The combination set forth in claim 1, wherein there is means yieldably urging the control members from the "Braking" range and said means is further operable to advance the control members from the "Braking" range into the "Low" position incident to manual release thereof while in the "Braking" range.

3. In a control unit utilizing fluid from a pressure source in the control of vehicle steering-by-driving apparatus which includes driven shafts respectively drivingly connected with propelling means at opposite sides of the vehicle, brakes for said shafts, change-speed power transmission mechanisms selectively operable for imparting driving force respectively to said driven shafts to drive the same at relatively high or low speeds or operable to neutral position to interrupt drive of said shafts: the combination of separate shaft brake operators for the shaft brakes and forcibly displaceable for engaging the shaft brake associated therewith to create braking action thereof according to the magnitude of displacement force applied to the operator therefor, separate transmission control hydraulic motor means for the transmission mechanisms and each being variably energizable when subjected to various statuses of pressure derived from said source for placing the transmission mechanism controlled thereby in the neutral, slow speed or high speed ratios, separate transmission control valve means interposed between the fluid pressure source and the motor means and each being operable to subject the motor means associated therewith to said pressure statuses, hydraulic motor brake control means respectively for the shaft brakes and each being energizable for applying braking force to its associated shaft brake operator according to the magnitude of fluid pressure imposed on its motor, separate adjustable pressure controlling brake valve means interposed between said source and the brake control motors and each valve means being operable to subject the motor associated therewith to fluid pressure derived from said source at a pressure magnitude according to the amount of adjustment of said valve means, control members respectively in control of the transmission control valve means and the brake valve means associated with each of said shafts and each being manipulatable selectively between "High" and "Low" positions wherein it is settable and manually retractible from the "High" position through the "Low" position into a "Braking" range, each control member being operable on its associated transmission control valve means while in the "High" position to subject its transmission control motor means to the pressure status placing the transmission mechanism controlled thereby in the high speed ratio, each control member being operable on its transmission control valve means while in its "Low" position to subject the transmission control motor means to the pressure status placing the transmission mechanism controlled thereby in the low speed ratio, each control member being operable on its transmission control valve means while in the "Braking" range to subject its transmission control motor means to the pressure status placing the transmission mechanism controlled thereby in the neutral position, and each control member being also operable while in the "Braking" range to adjust its pressure controlling brake valve means to subject its brake controlling motor to pressure correlated with the degree of retraction of the control member in said range.

4. In a control unit utilizing fluid from a pressure source in the control of vehicle steering-by-driving apparatus which includes driven shafts respectively drivingly connected with propelling means at opposite sides of the vehicle, brakes for said shafts, change-speed power transmission mechanisms respectively for said shafts and each being selectively operable into a driving condition for imparting driving force to its shaft or operable to a neutral condition to interrupt drive of its shaft: the combination of transmission control hydraulic motor means respectively for said transmission mechanisms and each being operable when subjected to different statuses of pressure derived from the fluid of said source for respectively conditioning its transmission mechanism in the driving condition or neutral, separate transmission control valve means interposed between said source and the respective one of said motor means and each being adjustable for individually determining said pressure statuses of its associated motor means, valve-adjusting control members respectively for said control valve means and each control member being settable in a "driving" position incident to adjusting its associated valve means to determine the driving condition of the associated transmission and retractible into a "Braking" position adjusting its associated valve means for determining the neutral condition of the transmission, shaft brakes respectively for said shafts and each being engageable in variable intensity to determine the resistance offered thereby to rotation of its associated shaft, brake operating hydraulic motors respectively for the shaft brakes and each being operable to engage its brake with an intensity correlated with the magnitude of fluid pressure imposed upon such motor, separate brake valve means interposed between said source and the respective one of the brake operating motors and each being adjustable for determining the amount of fluid pressure imposed upon the associated motor from said source, each control member being adapted to adjust its associated brake valve means to provide for pressure imposed upon the associated brake motor means with a magnitude according to the amount of retraction of such control member in said "Braking" range, means yieldably urging said control members advancively from the "Braking" range, and means manually operable independently of the control members to adjust the brake valve means to cause operation of the brake motors and thereby effect engagement of the shaft brakes in accordance with the amount of such adjustment independently of said control members.

5. In a unit utilizing fluid from a pressure source for controlling vehicle steering-by-driving apparatus which includes driven shafts respectively drivingly connected with propelling means at opposite sides of the vehicle, and separate change-speed power transmitting mechanisms each being selectively operable into a driving condition for imparting driving force to respective ones of said shafts or operable to neutral condition to interrupt drive of their associated ones of said shafts: separate control apparatus respectively for each of said power transmissions and the shaft drivable therefrom, each control apparatus comprising a control member settable in a "driving" position to determine the driving condition of the transmission and retractible into a "Braking" range incident to determining the neutral condition of the transmission, a shaft brake engageable in variable intensity to determine the resistance offered by the brake to rotation of said shaft, a brake operating hydraulic motor operable to engage the brake with an intensity correlated with the magnitude of fluid pressure imposed upon such motor, brake valve means interposed between said source and the brake operating motor and adjustable for determining the amount of fluid pressure imposed upon said motor from said source, said control member being adapted to adjust the brake valve means to provide for pressure imposed upon the brake motor means with a magnitude according to the amount of retraction of the control member in said "Braking" range and means yieldably urging said control member advancively from the "Braking" range.

6. The combination set forth in claim 5 wherein there is also means manually operable independently of control members to adjust the brake valve means to cause operation of the brake motor and thereby effect engagement of the shaft brakes in accordance with the amount of such adjustment of the valve means independently of said control members.

7. In a unit utilizing fluid from a pressure source for controlling vehicle steering-by-driving apparatus which includes driven shafts respectively drivingly connected with propelling means at opposite sides of the vehicle, brakes respectively for said shafts, and change-speed power transmitting mechanisms respectively for said shafts and each being selectively operable into a driving condition for imparting driving force to its associated shaft and alternatively operable to neutral condition to interrupt drive to its associated shaft: control members respectively for said transmissions, each control member being settable in a "driving" position to determine the driving condition of the transmission and retractible into a "Braking" range incident to determining the neutral condition of the transmission, brake-operating hydraulic motors operable to respectively engage said brakes with an intensity correlated with the magnitude of fluid pressure imposed upon such motors, brake valve means respectively interposed between said source and the brake-operating motors and adjustable for determining the amount of fluid pressure imposed upon said motors from said source, said control members being adapted to adjust the brake valve means to incur pressure imposed upon the brake motor means respectively associated with said control members with a magnitude according to the amount of retraction of such members in the "Braking"

range, a brake control member manually operable independently of said settable control members, and means establishing an operative connection between said manual control member and each of said valves for concurrently manipulating said valves to incur fluid pressure from the source onto the brake actuating motors with an intensity correlated with the degree of manipulation of such manual control member.

8. The combination set forth in claim 7 wherein there is mechanical brake-applying force-transmitting means interposed between said manual control member and said brakes, said force-transmitting means being operable sequentially with the means connecting the manually operable member with said valves and to transmit manual brake-applying force from said manually operable member to the brakes subsequent to operating the valves to establish communication between said source and the brake operating motors to cause manual operation of the brakes in the event of pressure failure at the fluid pressure source.

9. In a unit utilizing fluid from a pressure source for controlling vehicle steering-by-driving apparatus which includes driven shafts respectively drivingly connected with propelling means at opposite sides of the vehicle, and separate power transmitting mechanisms each being conditionable for imparting driving force to a respective one of said shafts or conditionable in neutral to interrupt drive of their associated one of said shafts: separate control apparatus respectively for each of said power transmissions and the shaft drivable therefrom, each control apparatus comprising a control member settable in a "driving" position to determine the driving status of the transmission and retractible into a "Braking" range incident to determining the neutral status of the transmission, a shaft brake engageable in variable intensity to determine the resistance offered by the brake to rotation of said shaft, a brake operating hydraulic motor operable to engage the brake with an intensity correlated with the magnitude of fluid pressure imposed upon such motor, and brake valve means interposed between said source and the brake operating motor and adjustable for determining the amount of fluid pressure imposed upon said motor from said source, said control member being adapted to adjust the brake valve means to provide for pressure imposed upon the brake motor means with a magnitude according to the amount of retraction of the control member in said "Braking" range.

10. For use in controlling vehicle steering-by-driving apparatus which includes driven shafts respectively drivingly connected with propelling means at opposite sides of the vehicle, and separate power transmitting mechanisms each being conditionable for imparting driving force to a respective one of said shafts or conditionable in neutral to interrupt drive of their associated one of said shafts: separate control apparatus respectively for each of said power transmissions and the shaft drivable therefrom, each control apparatus comprising a control member settable in a "driving" position to determine the driving status of the transmission and retractible into a "Braking" range incident to determining the neutral status of the transmission, a shaft brake engageable in variable intensity to determine the resistance offered by the brake to rotation of said shaft, and means operable under control of said control member for engaging the shaft brake at an intensity correlated with the amount of retraction of said control member into the "Braking" range.

References Cited in the file of this patent

UNITED STATES PATENTS

| | | |
|---|---|---|
| 1,276,172 | Burrell | Aug. 20, 1918 |
| 1,429,178 | Valentine et al. | Sept. 12, 1922 |
| 1,794,446 | Davis | Mar. 3, 1931 |
| 1,839,088 | DeNormanville | Dec. 29, 1931 |
| 1,855,965 | Hildebrand et al. | Apr. 26, 1932 |
| 1,905,952 | Scott | Apr. 25, 1933 |
| 1,933,208 | Cotal | Oct. 31, 1933 |
| 1,942,030 | Lane | Jan. 2, 1934 |
| 2,351,554 | Simpson | June 13, 1944 |
| 2,468,628 | Henning | Apr. 26, 1949 |
| 2,496,429 | Baker | Feb. 7, 1950 |